United States Patent [19]

Miura et al.

[11] Patent Number: 4,670,304
[45] Date of Patent: Jun. 2, 1987

[54] PROCESS FOR PRODUCING POROUS CERAMIC BOSY

[75] Inventors: Yasunao Miura, Kasugai; Hitoshi Yoshida, Okazaki; Yukihisa Takeuchi, Aichi; Kazuyuki Ito, Nishio, all of Japan

[73] Assignee: Nippondenso Co., Ltd., Kariya, Japan

[21] Appl. No.: 761,414

[22] Filed: Aug. 1, 1985

[30] Foreign Application Priority Data

Aug. 3, 1984 [JP] Japan ................. 59-164002

[51] Int. Cl.⁴ .................. B05D 3/02; B05D 3/12
[52] U.S. Cl. .................... 427/227; 427/240; 427/243; 427/244; 427/287; 427/379; 427/380
[58] Field of Search ........... 427/240, 243, 244, 227, 427/380, 379, 287

[56] References Cited

U.S. PATENT DOCUMENTS

| | | | |
|---|---|---|---|
| 2,392,263 | 1/1946 | Records | 427/240 |
| 4,076,888 | 2/1978 | Perugini et al. | 427/227 |
| 4,264,346 | 4/1981 | Mann | 55/523 |
| 4,276,071 | 6/1981 | Outland | 55/523 |
| 4,356,215 | 10/1982 | Ariol et al. | 427/214 |

FOREIGN PATENT DOCUMENTS 57-176110 10/1982 Japan .
58-151381 9/1983 Japan .

*Primary Examiner*—Norman Morgenstern
*Assistant Examiner*—Janyce A. Bell
*Attorney, Agent, or Firm*—Cushman, Darby & Cushman

[57] ABSTRACT

A porous ceramic body is prepared by dipping an organic foam having a three-dimensional network structure in a ceramic slurry to deposit a sufficient amount of the ceramic on the surface of the foam, moving an excess of the ceramic slurry contained in the foam to the intended peripheral region of the foam by exerting centrifugal force on the foam, thereby causing denser ceramic deposition in the peripheral region than in the other region of the foam, and then drying, solidifying, and baking to burn out and dissipate the foam and simultaneously sinter the ceramics.

13 Claims, 12 Drawing Figures

FIG. IA
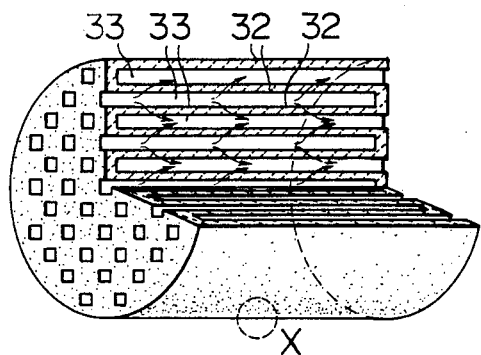
FIG. IC
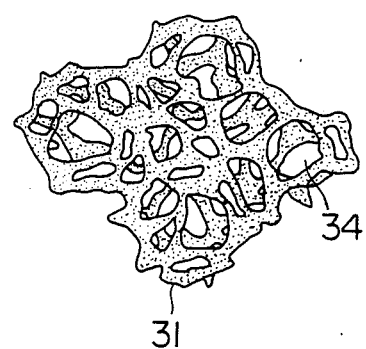
FIG. IB
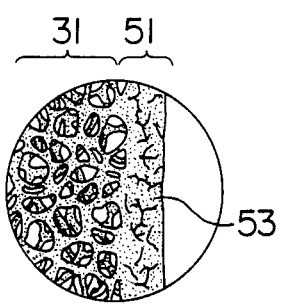

PROCESS FOR PRODUCING POROUS CERAMIC BOSY

BACKGROUND OF THE INVENTION

1. Field of the Invention

The present invention relates to a process for producing a porous ceramic body for use as filters to collect fine particle from the exhaust gas of internal-combustion engines or as catalyst carriers.

2. Description of the Related Art

Because of the low strength of peripheral portions of a porous ceramic body having a three-dimensional network structure, the ceramic body has hitherto been produced by the following processes or the like. One of the processes, as disclosed in Japanese Patent KOKAI (Laid-Open) No. 176,110/82, comprises the steps of wrapping an organic foam of three-dimensional network or reticulate structure, which is a starting material for porous ceramics, with another organic foam which is finer in cell sizes than the former, and applying a ceramic slurry into the outer foam. Another one of the processes, as disclosed in Japanese Patent KOKAI (Laid-Open) No. 151,381/83, comprises the step of impregnating the peripheral portion of said starting material foam directly with a dense ceramic slurry.

According to these processes, a skin layer having a fine texture is formed around a porous ceramic body.

However, these processes involve such problems that the operation to form the skin layer is very complicated, and that the skin layer is liable to be separated from the porous ceramic body.

SUMMARY OF THE INVENTION

An object of the invention is to provide a process for producing a porous ceramic body having a three-dimensional network structure and a high mechanical strength.

Another object of the invention is to provide a process for producing a porous ceramic body for use as filters to collect fine particles from the exhaust gas of internal-combustion engines or as catalyst carriers.

The present invention is characterized in that an organic foam skeleton of three-dimensional network structure is dipped in a ceramic slurry and then centrifugal force is exerted on the slurry-containing foam skeleton, thereby moving an excess of the slurry toward the periphery of the foam skeleton to concentrate the ceramic at the peripheral region.

BRIEF DESCRIPTION OF THE DRAWINGS

FIG. 1 shows a porous ceramic body obtained by the process of the present invention. FIG. 1(a) is a partial cross-sectional perspective view of the ceramic body, FIG. 1(B) is an enlarged cross-sectional view of the X-portion shown in FIG. 1(a), and FIG. 1(c) is a further enlarged view of a portion of the porous ceramic article.

FIG. 2 shows an apparatus for carrying out the process of the present invention.

FIGS. 5 and 6 show examples of the structure of the porous ceramic body produced by the process of the present invention.

DETAILED DESCRIPTION OF PREFERRED EMBODIMENTS

Figure 2A:
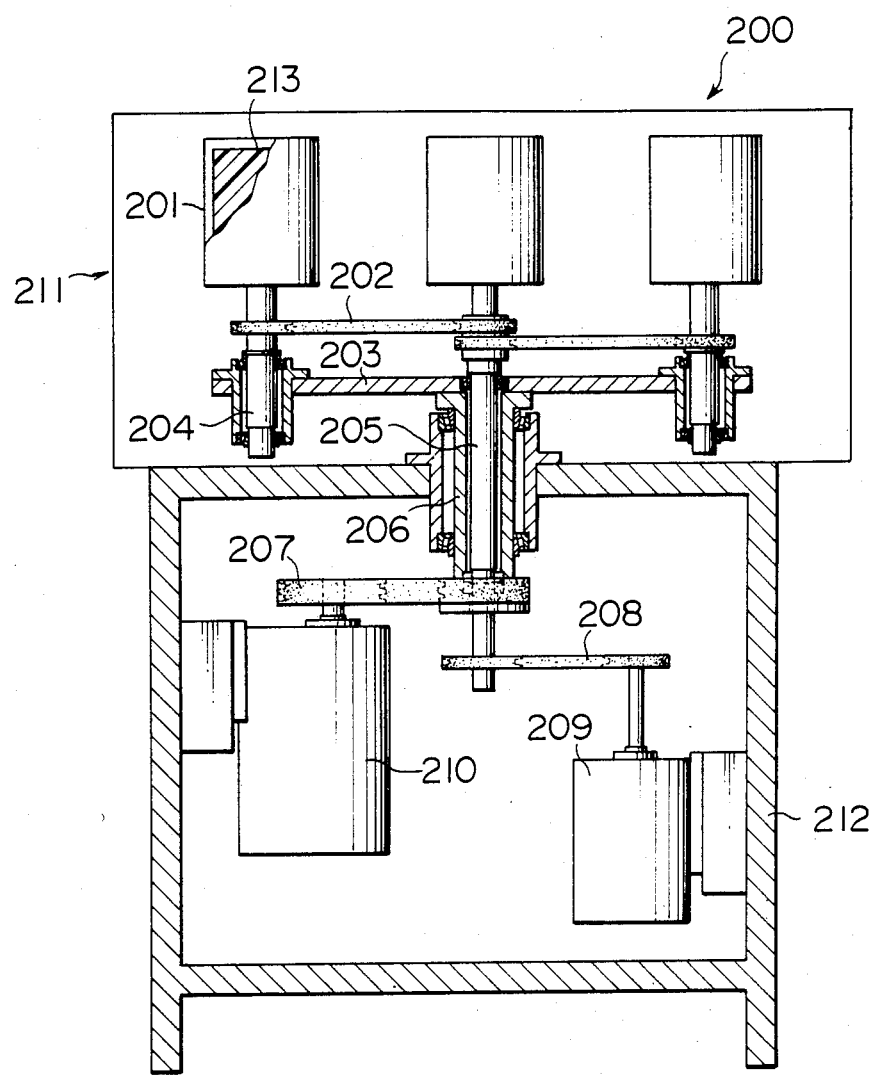
FIG. 2(a) is a vertical sectional view of the whole apparatus.

Referring to the drawings, the present invention is described below in detail.

Figure 3:
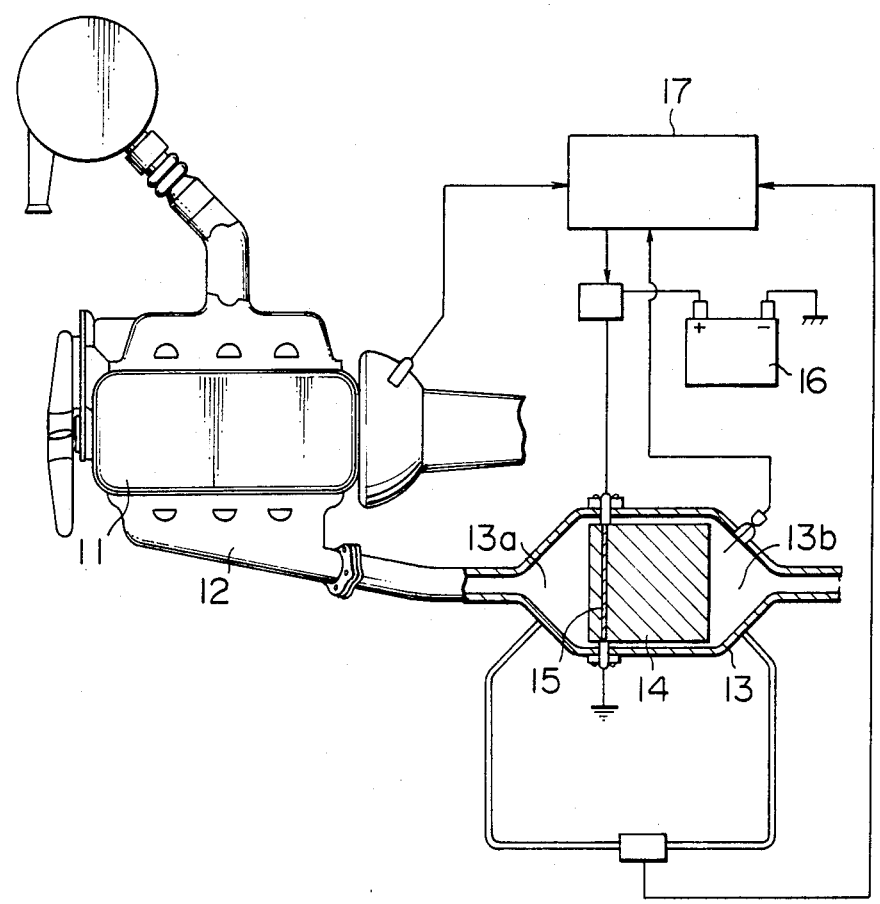

Referring first to FIG. 3, a device for collecting fine carbon particles is illustrated as an application example of the porous ceramic body of the present invention. This device is connected to a collecting exhaust pipe 12 communicating with an internal-combustion engine, specially a diesel engine 11, and comprises a metallic container 13 which has an exhaust inlet port 13a communicating with the collecting exhaust pipe 12 and an exhaust outlet port 13b and contains a filter member 14 for collecting fine particles and an electric heater 15 attached to the filter member 14 surface facing the exhaust inlet port 13a. The electric heater 15 is used for burning the fine particles caught by the filter member 14 to regenerate it. The power supply from a battery 16 to the heater 15 is controlled by a control circuit 17. This control is made with input signals from different kinds of sensors monitoring the pressure drop through the filter member 14, fuel consumption, and travel distance.

The exhaust gas from the engine 11 is introduced into the container 13 at the inlet port 13a, allowed to pass through the filter member 14, and discharged at the outlet port 13b. When the exhaust gas is allowed to pass through the filter member 14, fine carbon particles in the exhaust gas are caught and removed therefrom by the filter member 14.

Figure 4:
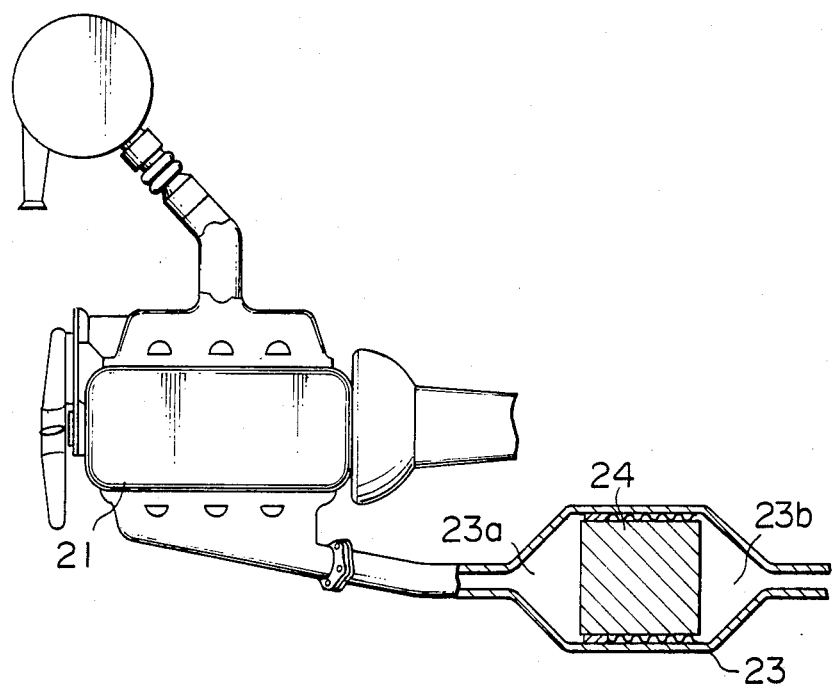
FIGS. 3 and 4 show examples of devices, wherein the porous ceramic body produced by the process of the present invention are used.

Referring then to FIG. 4, a catalyst carrier for cleaning harmful components in the exhaust gas is illustrated as an application example of the porous ceramic body of the present invention. The device shown in FIG. 4 is connected to a collecting exhaust pipe 22 communicating with an internal-combustion engine, particularly a gasoline engine 21, and comprises a metallic container 23 which has an exhaust inlet port 23a communicating with the collecting exhaust pipe 22 and an exhaust outlet port 23b and contains a carrier 24 supporting a catalyst for purging harmful components such as HC, CO, and NOx.

The exhaust gas from the engine 21 is introduced into the container 23 at the inlet port 23a, allowed to pass through the catalyst-supporting carrier 24, and discharged at the outlet port 23b. When the exhaust gas is allowed to pass through the supported catalyst consisting of platinum or some other suitable elements or compounds, so that the gas is turned harmless.

In the present invention, the porous ceramic body used as the filter member 4 for a collector or the catalyst carrier 24 has fundamentally a three-dimensional network structure and can be produced by any process comprising the steps of dipping an organic foam of a three-dimensional network structure, for example, a polyurethane foam, in a ceramic slurry and causing a ceramic material, for example, alumina, to adhere to the surface of the network skeleton. The organic foam and ceramic material herein used are of the types hitherto used in the art. Such ceramic materials include, for example, alumina, mullite, cordierite, and compounds convertible by burning into alumina, mullite, or cordierite.

Porous ceramic bodies produced by the process comprising the abovementioned steps have, for example, the following types of texture:

A porous ceramic body of a first type has such a texture as shown in FIGS. 1(a), 1(b), and 1(c), that is, this type ceramic body is constructed of a porous-ceramic skeleton 31 of a three-dimensional network structure; the body has numerous channels 33 separated by numerous partitions 32 consisting of said skeleton and as a whole a cylindrical honeycomb structure and parts of the channels 33 having openings at both the ends thereof are closed alternately so as to flow the exhaust gas introduced into one channel 33 to the neighboring channel 33 through a space 34 in the three-dimensional network skeleton 31.

Figure 5A:
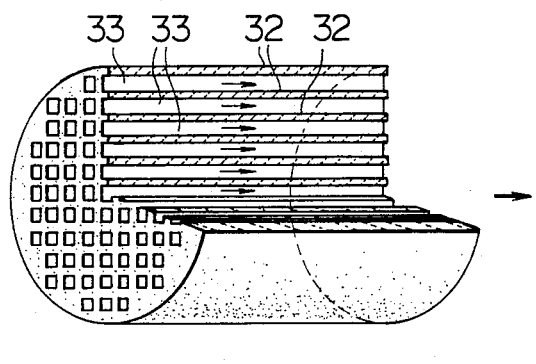
FIGS. 5(a) and 6(a) are overall perspective views of these porous ceramic bodies.
Figure 5B:
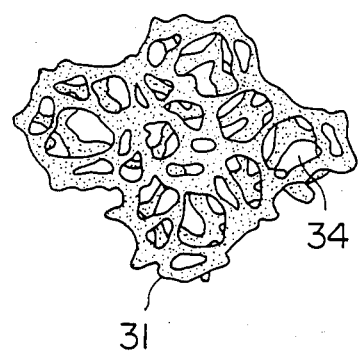
FIGS. 5(b) and 6(b) are partially enlarged views of these porous ceramic bodies.

A porous ceramic body of a second type, as shown in FIGS. 5(a) and 5(b), has numerous channels 33 separated by numerous partitions 32 consisting of a three-dimensional network skeleton 31 and as a whole, cylindrical honeycomb structure, similarly to those of FIG. 1; however, these porous ceramics are produced so that parts of the channels will not be clogged and part of the exhaust gas will penetrate partitions 32.

Figure 6A:
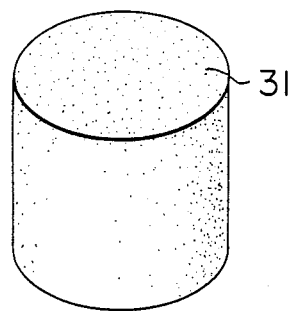
Figure 6B:
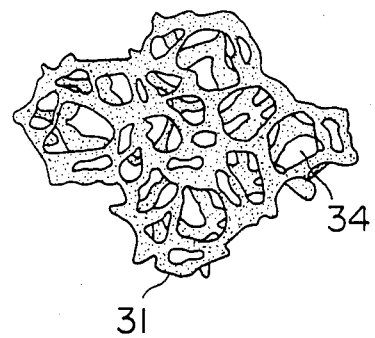

A porous ceramic body of a third type, as shown in FIGS. 6(a) and 6(b), has a uniform three-dimensional network skeleton 31 and is assumed to have such a texture as to flow the introduced exhaust gas out of the body via spaces separated by the skeleton.

The present invention, however, is not limited to the above examples of porous ceramics.

The present invention is illustrated in more detail with reference to the following examples.

Figure 2B:
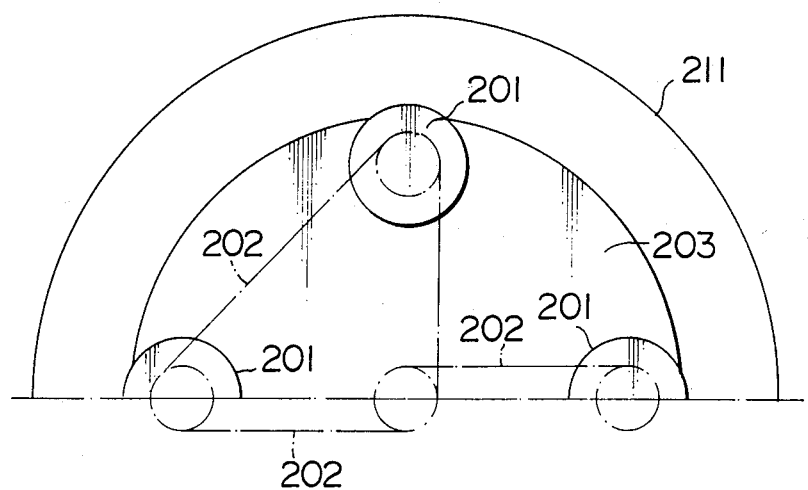
FIG. 2(b) is a plan view of the apparatus.

An open cell polyuretane foam having such a structure as shown in FIGS. 1(a) and 1(b) is prepared, the cell film of which can be degraded and removed by dipping in a strongly alkaline solution such as that of sodium hydroxide. On the other hand, a ceramic slurry is prepared by mixing 100 parts by weight of a powder composed of MgO, $Al_2O_3$, and $SiO_2$ in such proportions that the powder on burning becomes cordierite crystals, with 60-80 parts by weight of water and 6-10 parts by weight of poly(vinyl alcohol). The above polyurethane foam is dipped in this ceramic slurry to cause the ceramic material to adhere to the surface of the polyuretane network skeleton. Then the foam is taken out of the ceramic slurry and an excess of the adhering ceramic slurry is concentrated in the vicinity of the skin of the foam by means of a centrifugal separator as shown in FIG. 2.

This centrifugal separator 200 is divided into upper and lower sections. The upper section has 4 centrifugal separation buckets 201 (3 of which are shown in FIG. 2) in a cylindrical cover 211. The lower section has a motor 210 for revolution (around the central axis of the centrifugal separator) and a motor 209 for rotation (around the central axis of each bucket) in a support 212. The rotation (usually a speed of 500 r.p.m. is desirable) of the motor 210 for revolution is transmitted by a V-belt 207 to a shaft 206 for revolution, thereby rotating a turntable 203 which is fixed to the shaft 206. Thus the 4 buckets 201 attached to the turntable 203 revolve around the central axis of the centrifugal separator 200. On the other hand, the rotation (usually a speed of 800 r.p.m. is desirable) of the motor 209 for rotation is transmitted by a V-belt 208 to a main shaft 205 for rotation and further transmitted by V-belts 202 to sub-shafts 204 for rotation, thus rotating the 4 buckets around the axis of each of them.

In this way, an excess of the ceramic slurry contained in each polyurethane foam 213 is moved therein in the normal directions by the action of centrifugal force, that is, the ceramic slurry is concentrated in the peripheral region of the polyurethane foam 213, forming there a surface layer having a uniform thickness and a uniform and higher ceramic concentration than that of the other region.

Then the motors 209 and 210 are stopped to cease the revolution and rotation of the buckets, the polyurethane foams 213 are taken out, and dried by heating in a microwave oven or a hot-air dryer at 100°-200° C. for 10-90 minutes. Then the dipping in the ceramic slurry, centrifugal treatment, and drying may be repeated several times.

Thereafter, the ceramic-containing polyuretane foams 213 are burned at a temperature of 1300°-1470° C. for 2-6 hours.

Thus, the porous ceramic body constructed to have a three-dimensional network structure can be obtained which each has, as shown in FIG. 1(c), a dense ceramic surface layer 51 having no interstices other than voids 52, which result from the dissipation of the polyurethane by burning and pores 53 which the ceramic material has in itself.

In the next place, the centrifugal treatment is explained in more detail.

To condense the ceramic slurry in the vicinity of the surface skins of the polyurethane foams, these foams are arranged radially from the revolution center of the centrifugal separator and the centrifugal separator is operated, that is, the so-called revolution of the foams is effected, whereby an excess of the ceramic slurry contained in each foam will be moved therein in the normal directions by the action of centrifugal force. When the central axis of each foam, in this case, is nearly perpendicular to the revolution plane, the ceramic slurry will be concentrated at a region near the surface skin and most remote from the revolution center. Consequently, it is difficult with this operation only to form a surface layer having a uniform thickness and ceramic concentration around the foam. Therefore, the rotation of the foams, arranged radially from the revolution center, around the axis of each foam, that is, the so-called rotation of the foams, is combined with the above revolution, whereby a surface layer having a uniform thickness and ceramic concentration can be formed around the desired periphery of each interior foam since the position, on the skin, most remote from the revolution center changes constantly.

On the other hand, if a surface layer is intended to be formed by only the rotation of the foams around the axis of each foam, the movement of the ceramic slurry toward the foam surface will be scarcely caused in the vicinity of the rotation axis since the centrifugal force exerted on the ceramic slurry in such a region is very weak. In consequence, no dense ceramic layer will be formed in the peripheral region of the foam.

Figure 7:
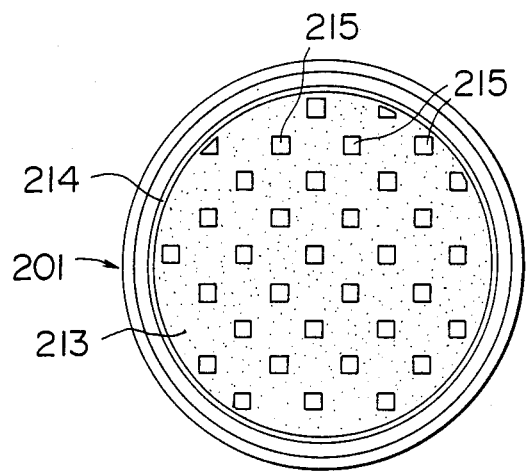
FIG. 7 is a horizontal sectional view of a bucket for centrifugal separation used in an embodiment of the present invention.

In the case of the revolution combined with the rotation, further better results will be obtained if the polyurethane foam as a base material has been subjected to a treatment as shown below so that an excess of the ceramic slurry moved to the vicinity of the surface skin of the foam will not pass through the surface skin to be discharged to the exterior. For instance, it is advisable to apply a hygroscopic sheet 214 such as japanese paper, as shown in FIG. 7 to the surface skin of the polyurethane foam so as to leave no space between the bucket and the foam inserted therein. In this case, the hygroscopic sheet acts as a dense film impermeable to the ceramic slurry. It is also possible to apply such a method that the surface layer is made finer in network than the interior or a film covering the surface is formed, by controlling the mold temperature when the polyurethane foam is prepared by foam molding.

The present invention is not limited to the above examples, and such various modifications as follow are also possible without departing from the spirit of the present invention.

(1) The organic foam used as a base material is not limited to polyurethane foams; various organic foams having open cells can be used.

(2) Also the ceramic material used is not limited to cordierite; various ceramic materials can be used.

(3) The driving forces for the revolution and the rotation in the precession type of centrifugal separator are not necessarily transmitted from different power systems but from one power system as well.

According to the present invention, as described in detail hereinbefore, the porous ceramic body and the surface layer are combined into a single body forming an end product and hence such a problem as peeling does not arise since an excess of the ceramic slurry adhering to the organic foam network is collected by the action of centrifugal force in the vicinity of the periphery. As to the dimensional accuracy, the dimensions of the original porous body are left intact and hence the present process has also an advantage in that factors having adverse effect on the dimensional accuracy are limited and the control of the dimensions is easy. In addition, since such an excess ceramic slurry that has hitherto been discharged to the exterior is used to form the surface layer without discharging, efficient utilization of the ceramic slurry is possible. Moreover, the present process also is very simple.

What is claimed is:

1. A process for producing a porous ceramic body, which comprises the steps of:

dipping an organic foam having a three-dimensional network structure in a ceramic slurry to deposit a sufficient amount of the ceramics on the surface of the foam, and moving an excess of the ceramic slurry contained in the foam to the intended peripheral region of the foam by exerting centrifugal force on the foam, thereby causing denser ceramic deposition in the peripheral region than in the other region of the foam, and ceasing the exertion of centrifugal force on the foam, and then drying and baking to burn out and dissipate the foam and simultaneously sinter the ceramics.

2. The process of claim 1, wherein the organic foam is made of polyurethane.

3. The process of claim 1, wherein the ceramic slurry contains alumina, mullite, cordierite, or a compound convertible by baking into alumina, mullite or cordierite.

4. The process of claim 1, wherein the slurry is obtained by stirring a mixture of 100 parts by weight of a powder of the ceramics, 60 to 80 parts by weight of water, and 6 to 10 parts by weight of poly(vinyl alcohol).

5. The process of claim 1, wherein the centrifugal force on the foam is obtained by applying revolution and rotation to buckets in which the foam is contained.

6. The process of claim 5, wherein the revolution and the rotation are effected at respective numbers of revolutions of 500 r.p.m. and 800 r.p.m.

7. The process of claim 1, wherein the drying is carried out at a temperature of 100° to 200° C. for a period of 10 to 90 minutes.

8. The process of claim 7, wherein the drying is carried out in a microwave oven or a hot-air dryer.

9. The process of claim 1, wherein the dipping and centrifugation are carried out at least once.

10. The process of claim 1, wherein the baking is carried out at a temperature of 1300° to 1470° C. for a period of 2 to 6 hours.

11. The process of claim 1, wherein a hygroscopic sheet is applied around the organic foam so that the slurry is not discharged from the foam.

12. The process of claim 11, wherein the hygroscopic sheet is japanese paper.

13. The process of claim 1, wherein the porous ceramic body has a honeycomb structure.

* * * * *